US008738391B2

(12) United States Patent
Lin et al.

(10) Patent No.: US 8,738,391 B2
(45) Date of Patent: May 27, 2014

(54) USING NON-TEXTUAL NOTATION FOR DESCRIBING SERVICE RELATED HUMAN EXPERIENCE BASED ON A HIERARCHAL MODEL OF HUMAN NEEDS

(75) Inventors: Raymund J R Lin, Taipei (TW); Amnon Ribak, Misgav (IL); Yoav Rubin, Haifa (IL); Susan L Spraragen, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 13/301,802

(22) Filed: Nov. 22, 2011

(65) Prior Publication Data

US 2013/0132299 A1    May 23, 2013

(51) Int. Cl.
*G06Q 10/00* (2012.01)
(52) U.S. Cl.
USPC ............ 705/1.1; 705/7.29; 434/236; 434/238
(58) Field of Classification Search
USPC ........................... 705/1.1, 7.29; 434/236, 238
See application file for complete search history.

(56) References Cited

U.S. PATENT DOCUMENTS

| 7,562,816 | B2 | 7/2009 | Abraham et al. | |
| 7,774,713 | B2 | 8/2010 | Mital et al. | |
| 2007/0124184 | A1 | 5/2007 | Schmit et al. | |
| 2008/0082399 | A1* | 4/2008 | Noble et al. | 705/10 |
| 2008/0091515 | A1 | 4/2008 | Thieberger et al. | |
| 2009/0063256 | A1 | 3/2009 | Pradeep et al. | |
| 2010/0262467 | A1* | 10/2010 | Barnhill et al. | 705/10 |
| 2011/0046473 | A1* | 2/2011 | Pradeep et al. | 600/413 |
| 2011/0213211 | A1* | 9/2011 | Stevens et al. | 600/300 |
| 2011/0246513 | A1* | 10/2011 | Covannon et al. | 707/769 |
| 2012/0194082 | A1* | 8/2012 | Huang et al. | 315/152 |

OTHER PUBLICATIONS

Palle Derkert., "Emotions through Graphics Depicting Biometrical Sensor Data", Department of Computer and Systems Sciences, Stockholm University/Royal Institute of Technology, Swedish Institute of Computer Science, Dec. 2006.
Bosse et al., "A Computational Model based on Gross' Emotion Regulation Theory", Cognitive Systems Research vol. 11, Issue 3, pp. 211-230, Sep. 2010.
Joost Broekens., "Modeling the Experience of Emotion", International Journal of Synthetic Emotions, pp. 1-17, 2010.
Luke Wroblewski., "MIX07: The Emotion of Customer Experience", May 3, 2007.
John W.K. Leung and Kenneth K. Kwong., "A structured approach to describing service for creating a delightful experience", Computers & Industrial Engineering, vol. 57, Issue 2, pp. 563-570, Sep. 2009.

* cited by examiner

*Primary Examiner* — Jami A Plucinski
*Assistant Examiner* — Fathi Abdelsalam

(57) ABSTRACT

A system for describing and analyzing service-related human experience in organizational or commercial environments based on a hierarchical model of needs (e.g. Maslow's hierarchy of needs) is provided herein. The system may include a classifier configured to classify experience states based on a predefined hierarchical model of needs, to yield a classification; a modeler configured to model a real-life environment into a model that includes a set of process instances associated with users; and an experience notation generator configured to: extract experience-related data associated with the users from the model, based on the classification; and represent the experience-related data of each one of the process instance as a non-textual time series, based on the classification. Optionally, the time series may be used to produce reports using an analyzer. The reports may be applied to a remedy engine to generate recommendations for improving the human experience.

20 Claims, 3 Drawing Sheets

USING NON-TEXTUAL NOTATION FOR DESCRIBING SERVICE RELATED HUMAN EXPERIENCE BASED ON A HIERARCHAL MODEL OF HUMAN NEEDS

BACKGROUND

1. Technical Field

The present invention relates to monitoring and analyzing service related user or customer experience over time in a given real-life environment and more particularly, to doing so in accordance with a predefined classification based on a hierarchical model of human needs. Additionally, embodiments of the invention further provide measures for improving the aforementioned experience based on the analysis.

2. Discussion of the Related Art

The importance of user experience or customer experience from a business value point of view cannot be overestimated. Many commercial and governmental organizations are trying today to put more focus on analyzing and describing the experience in both quantitative and qualitative measures so that the user or customer experience may be improved resulting in a higher level of user or customer satisfaction which leads in turn to more repeat business and a higher wallet share. This form of analysis and description is usually being carried out by studying questionnaires filled up by users of services relating to the customer or service experience.

Currently, some modeling tools are known to be used by consultants and design firms. Some of known modeling tools include mind-maps and 'service blueprinting' that are being used to develop the experience as a layer within the service development. However the current tools lack structure and further they do not provide a good quantitative framework for evaluating metrics of the experience as a whole.

One of the drawbacks of currently available traditional service model stems from the fact that they focus on modeling the service in terms of "delivery". Thus, while the delivery methods and practices may be well documented, the experience itself is not explicitly documented. This is, because, among other things, no common language is known to enable the documentation in a non-textual manner, of sequences of user or customer experience.

BRIEF SUMMARY

One aspect of the present invention provides a system for using non-textual notation for describing human experience in organizational or commercial environments based on a classification deriving from a hierarchical model of human needs. The system may include a classifier configured to classify experience states based on a predefined hierarchical model of needs, to yield a classification; a modeler configured to model a real-life environment into a model that includes a set of process instances associated with users; and an experience notation generator configured to: extract experience-related data associated with the users from the model, based on the classification; and represent the experience-related data of each one of the process instance as a non-textual time series, based on the classification. Optionally, the time series may be used to produce reports using an analyzer. The reports may be applied to a remedy engine to generate recommendations for improving the human experience. The recommendation may further be used and reused in an experience library.

Other aspects of the invention may include a method arranged to execute the aforementioned system and a computer readable program configured to execute the aforementioned system. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
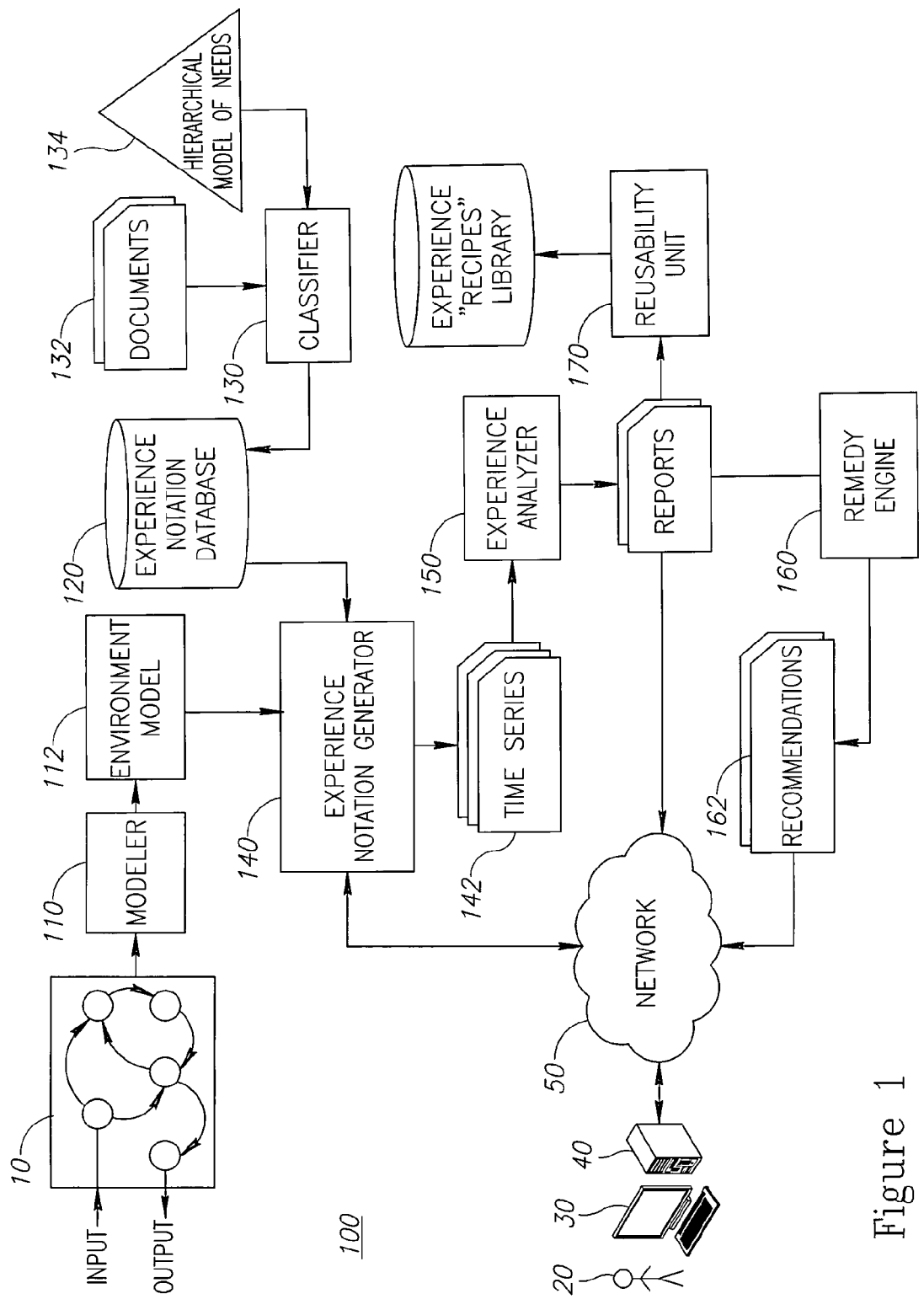
FIG. 1 is a high level schematic block diagram illustrating the environment of a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "user experience" as used herein refers to the ISO definition pertaining to "a person's perceptions and responses that result from the use or anticipated use of a product, system or service". Derived from this definition is that a user experience is subjective and focuses on the use. Additionally, user experience includes all the users' emotions, beliefs, preferences, perceptions, physical and psychological responses, behaviors and accomplishments that occur before, during and after use.

The term "customer experience" as used herein refers to the sum of all experiences a customer has with a supplier of goods or services, over the duration of their relationship with that supplier.

The term "hierarchal model of human needs" as used herein refers to a hierarchal model that represent human needs of different nature in which some of the needs are essential and other are optional and wherein usually, when the needs of the lower levels are provided, the motivation for the needs of the higher levels increases. A well known hierarchal model of human needs is Maslow's hierarchy of needs. The bottom-up structure of the Maslow model starts with physical needs at the bottom and goes up to security, friendship and love, esteem and finally, at the upmost level, self-actualization. The Maslow model is often used to explain human behavior, and particularly, motivation for actions.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating an environment in which a non-limiting exemplary system 100 is implemented in a client-server configuration according to some embodiments of the present invention. System 100 may include a client computer 40 associated with a display 30 acting as user interface for user 20, wherein client computer 40 is connected via a network 50 various components of system 100 that are carried out on the server side.

On the server side, system 100 may include a classifier 130 configured to classify human behaviors derived from documents 132, based on a predefined hierarchical model of needs 134, into an experience notation database 120. The predefined classification may be, in a non-limiting example, Maslow's hierarchal model of needs and so experience notation database 120 stores a respective mapping between human operations and the appropriate layer in the hierarchal model.

In some non-limiting embodiments, system 100 may further include modeler 110 that is configured to model a real-life environment 10 into a model 112 that includes a set of process instances associated with users (not shown). System 100 may further include an experience non-textual notation generator 140 that receives model 112 as an input and is further connected to experience notation database 120.

Experience non-textual notation generator 140 is configured to extract from model 112 experience-related data associated with the users and then generate, based on the predefined classification of hierarchy of needs from experience notation database 120, a representation of the experience-related data of each one of the process instance as a set of non-textual time series 142.

In the context of services, the experience notation may refer to at least one of the following parameters: service and service experience, service preferences, service expectations and service memories. Similarly, with the necessary changes, similar parameters may be addressed in the context of user experience, whether the user is experiencing a product or a service, and whether the product is tangible or intangible.

The non-textual notation further indicates the location over the hierarchical model of needs so that it forms a language for describing the experience of the user or the customer in terms of the satisfied and unsatisfied needs. By comparing the required human needs and the actual human needs that are being addressed at each point of time, a better analysis of the human experience during service interaction can be achieved. This would allow to precisely define how long a user or a customer should be in a specific state, what are the relationships between states and further service related metrics affecting the user and customer experience.

In order to generate experience notation database 120, classifier 130 is configured to go over documents 132 that contain either textual or non-textual data that describe process instance that provide data regarding emotional situation of users responsive to actual situations and operations in a real-life environment. Classifier 130 may be either implemented automatically by parsing documents 132 and applying a decision function that is based upon hierarchal model of needs 134 (being, for example, based on Maslow's hierarchal needs). By associating the variety of human operation derived from the documents with one of the layers of model of needs 134, experience non-textual notation generator 140 can transform actual human experience in the form of a sequence of human operations, behaviors or feelings, into a non-textual representation that expresses the level of need addressed by each portion of the human experience being the sequence of human operations.

Consistent with some embodiments of the present invention, the non-textual notation is indicative of at least one of: location of the human observer's needs at the hierarchical model of human needs, emotional states of the user as reflected by addressed and unadressed needs, operational state of the users, and their respective lengths of time.

In one non-limiting example, the non-textual notation may be based at least partially on musical notes, wherein the higher the musical note is, the higher the need of the hierarchal model is being addressed. Advantageously, musical note benefit from historically long developed human association with emotional situations. Chords and sequence of musical notes may thus be easily used for describing emotions that form part of the experience of the users as a whole. Transforming the musical notes notation in an auditory signal enable user 20 to receive an auditory representation of the time series 142 indicative of the experience, even if user 20 is unfamiliar with reading musical notes. Alternatively, the non-textual notation may be based on well known emoticons being conventional graphic notation indicative of emotional situations. It is further understood that the on-textual notation may be also tailored and designed ad hoc for implementing embodiments of the present invention.

Consistent with some embodiments of the present invention, system 100 may further include an experience analyzer 150 which may receive time series 142 as an input. Experience analyzer 150 is configured to analyze time series 142, by applying user-defined requirements, thus generating reports 152 indicative of a level satisfaction of the users. Reports 152 may also provide insight about the adherence between the emotional situation of the users over time and the process instances as originally planned by the system designers of environment 10.

The reports may be then used for other purposes. Consistent with some embodiments of the present invention, system 100 may further include a remedy engine 160 that receives reports 152 as an input and is further configured to generate recommendations 162 based on reports 152. Advantageously, recommendations 162 may be directed at amending the process instances so as to increase the level of satisfaction of the users. The recommendations may textually provide operational amendments to be applied to environment 10 to achieve the aforementioned improvement of the level of satisfaction. In other words, higher needs of Maslow's model will be addressed successfully.

Alternatively and additionally, and consistent with some embodiments of the present invention, system 100 may further include reusability unit 170 configured to generate an experience "recipes" library 172 that stores process instances that are associated with reports 152 with a level of satisfaction of the users above a specified threshold. These experience "recipes" may be sold to organizations and companies in order to improve the experience of their customers.

Additionally, system 100 may be used as a combination of an analysis-synthesis tool by which an environment 10 of an organization or a company being analyzed in a first stage, to generate reports 152. Then, remedy engine 160 or reusability unit 170, may be used to generate products that are used to improve the experience along predefined sequences. Additionally and alternatively, other products such as specified sequences that are known to be successful from a user experience point of view may be generated. These products may be sold as a software service on itself.

Advantageously, embodiments of the present invention takes together new knowledge in a plurality of research fields such as: brain science, service sciences, and mathematical analytics, and the like. The combined knowledge is then used to model the experience itself so that a common non-textual language is used. This actually provides a working framework that makes the analysis viable in assessing real-life environment in a coherent and repeatable manner so that the experience notation brings along significant business value.

Figure 2:
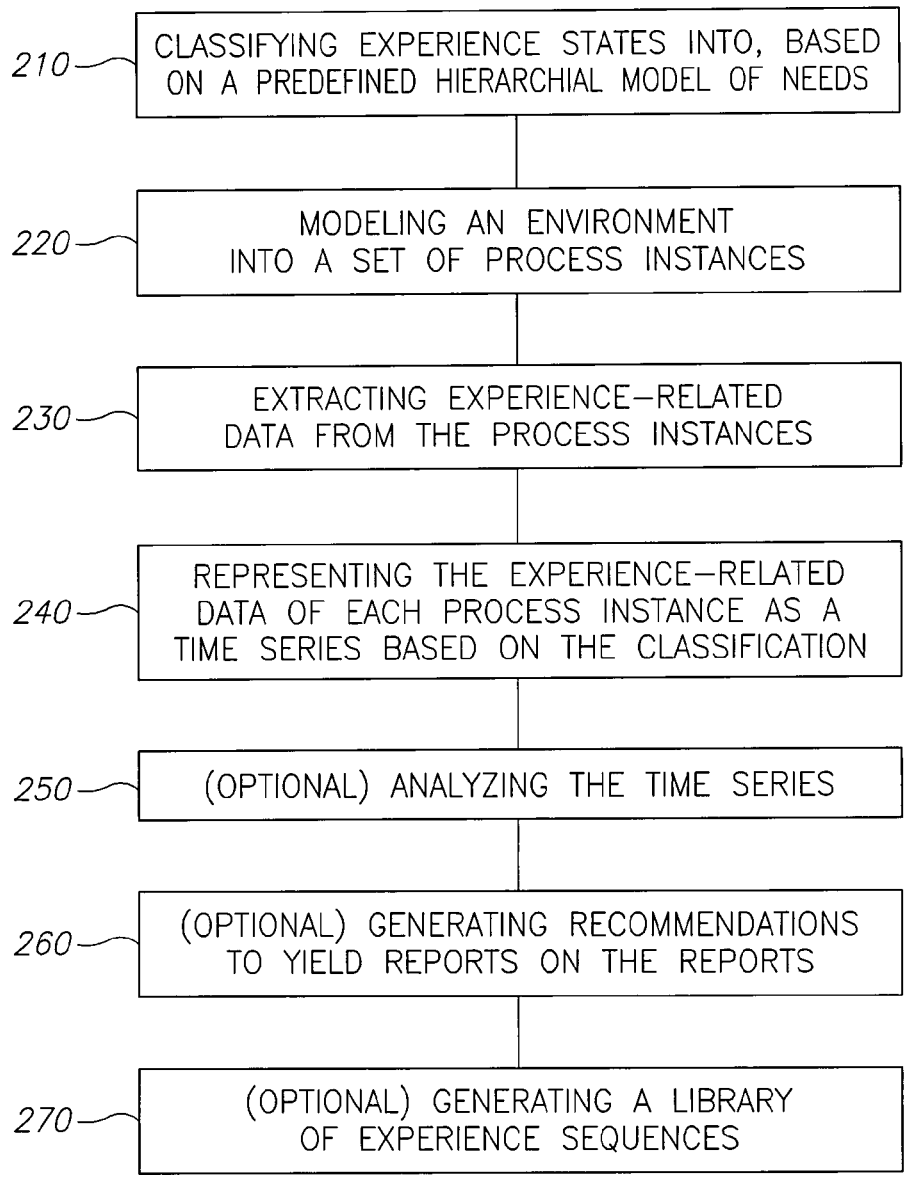
FIG. 2 is a high level schematic block diagram illustrating a system according to some embodiments of the invention.

FIG. 2 is a high level flowchart diagram illustrating a method 200 according to some embodiments of the invention. It is understood that method 200 may be carried out by software or hardware other than the aforementioned architecture of system 100. However, for the sake of simplicity, the discussion of the stages of method 200 is illustrated herein in conjunction with the components of system 100. Method 200 starts with the stage of classifying 210 possibly via classifier 130, experience states based on a predefined hierarchal model of needs; The method goes on to the stage of modeling 220 possibly via a modeler 110 a real-life environment 10 into a model 112 which includes a set of process instances associated with users. The method goes on to the stage of extracting 230, possibly via experience non-textual notation generator 140 experience-related data associated with the users from model 112. Then the method proceeds to the stage of representing 240 the experience-related data of each one of the process instance as a time series 142 based on the classification. The aforementioned stages may be carried out in operative association with a dedicated hardware or a tailored combination of software and hardware.

Consistent with some embodiments of the present invention method 200 may further include a stage of generating a database of non-textual notation of experience, to yield the predefined classification. Embodiments of the present invention may include the generation of such a database or alternatively, merely applying it to actual experience related data.

Consistent with some embodiments of the present invention method 200 may further include the optional stage of analyzing 250 the time series, by applying user-defined requirements, to yield reports indicative at least partially of a level satisfaction of the users either in user or customer experience, and relate those levels of satisfactions to the human needs that are being addressed, and the sequence in which they are addressed.

Consistent with some embodiments of the present invention, method 200 may further include the optional stage of generating recommendations 260 based on the reports, wherein the recommendation are directed at amending the process instances such that the level of satisfaction of the users increases. Similarly, real-life environment may be analyzed and when an experience flaw is detected, a remedy in the form of amended sequence of operations may be used in order to improve the metrics of the user or customer experience.

Consistent with some embodiments of the present invention, method 200 may further include the optional stage of generating a library 270 of process instances that are associated with reports with level of satisfaction of the users above a specified threshold. Such libraries may be sold either as separate sequences or as packages to create desirable effect of user or customer experience.

Figure 3:
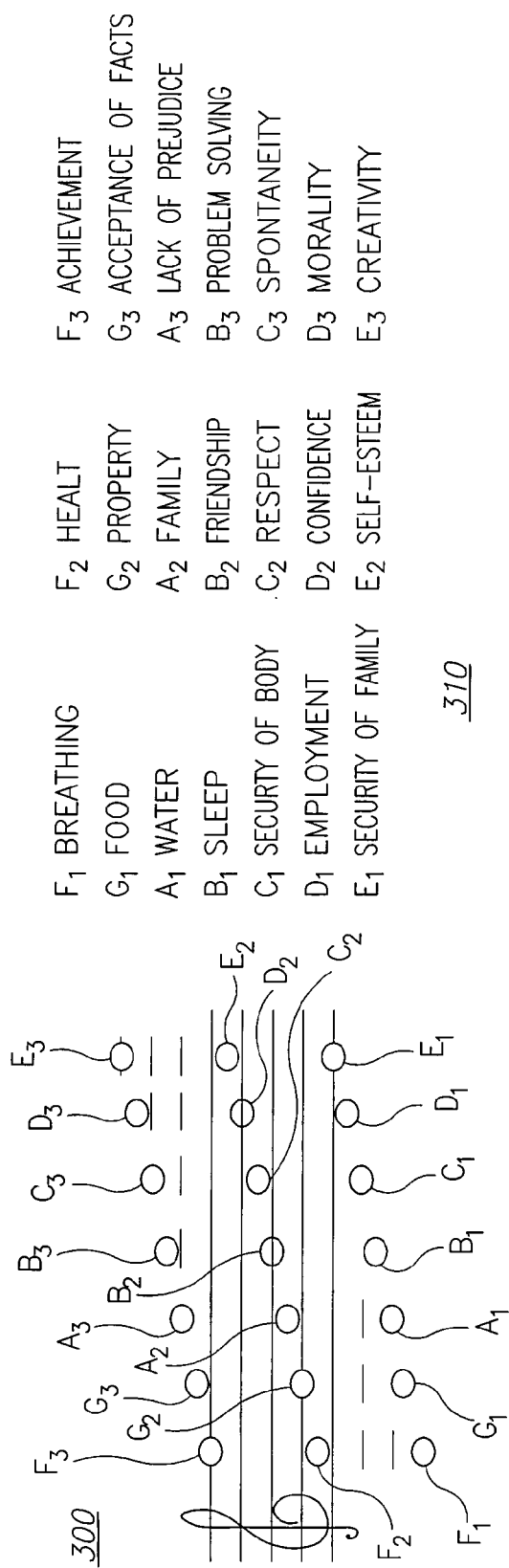
FIG. 3 show diagrams illustrating some aspects according to some embodiments of the invention.
Figure 3:
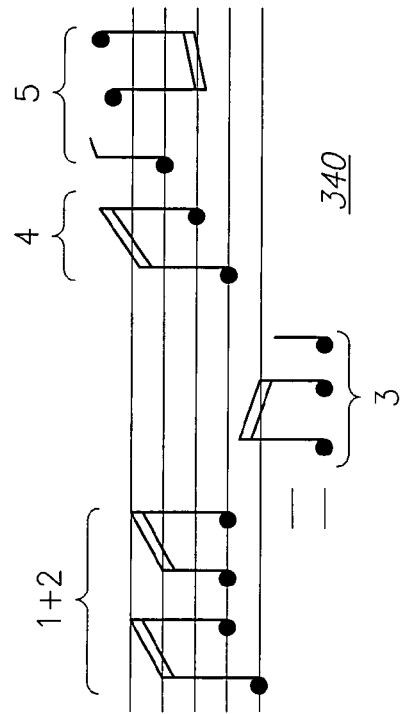
Figure 3:
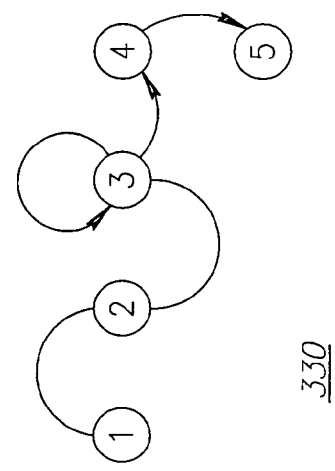

By way of illustration and not by way of limitation, FIG. 3 shows how the experience, in terms of the Maslow hierarchical order of needs, may be represented by musical notes. The musical notes 310 are mapped into ordered needs according to Maslow's hierarchy. A state machine 320 may represent the environmental model according to which a user operates within an organization or as a client. The musical notes representation 330 is based on the mapping of the experience 310 as well as based on the model of the operation of the users 320.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computerized method of representing user experience through non-textual notation, comprising:
  Classifying, using a computerized processor, each one of a plurality of user experience states with a human need classification by identifying, based on a predefined hierarchical model of human needs, a human need that is being addressed at each one of the plurality of user experience states during a sequence of a service provided to users;

modeling, using a computerized processor, a real-life environment into a model that includes a plurality of process instances that represent user operations performed at each one of the plurality of user experience states while the users are engaged in receiving the service;

extracting, using a computerized processor, user experience-related data relating to the service from each one of the plurality of process instances of the service; and representing, using a computerized processor, the user experience-related data of each one of the plurality of process instances as a non-textual notation based on the human need classification assigned to the user experience states, the non-textual notation is expressed as a time series to represent the sequence of the service over time; and wherein the non-textual notation is based at least partially on musical notes, wherein higher notes represent a higher location in the hierarchical model of human needs.

2. The method according to claim 1, further comprising generating a database for storing the non-textual notations of the user experience-related data.

3. The method according to claim 1, wherein the non-textual notation is indicative at least of: location along the hierarchical model of human needs of the user, emotional state of the user, operational state of the user, and their respective lengths of time.

4. The method according to claim 1, further comprising analyzing the time series, by identifying a set of human needs addressed in each one of the plurality of process instances and the level in which the set is addressed, to yield at least one report indicative at least partially of a satisfaction level of the users regarding the set of human needs addressed during each one of the plurality of process instances.

5. The method according to claim 4, further comprising generating at least one recommendation based on the at least one report, wherein the at least one recommendation is directed at amending at least one of the plurality of process instances such that the human needs are better addressed in order to increase the satisfaction level.

6. The method according to claim 4, further comprising generating a library containing at least one sequence of the plurality of process instance that is associated with the at least one report in which the satisfaction level is above a specified threshold.

7. A system for representing user experience through non-textual notation, comprising:
 a computerized processor;
 a classifier configured to classify each one of a plurality of user experience states with a human need classification by identifying, based on a predefined hierarchical model of human needs, a human need that is being addressed at each one of the plurality of user experience states during a sequence of a service provided to users;
 a modeler configured to model a real-life environment into a model that includes a plurality of process instances that represent user operations performed at each one of the plurality of user experience states while the users are engaged in receiving the service; and
 an experience notation generator configured to:
  (i) extract user experience-related data relating to the service from each one of the plurality of process instances of the model; and
  (ii) represent the user experience-related data of each one of the plurality of process instances as a non-textual notation based on the human need classification assigned to the user experience states, the non-textual notation is expressed as a time series to represent the sequence of the service over time;
   wherein the non-textual notation is based at least partially on musical notes, wherein higher notes represent a higher location in the hierarchical model of human needs; and
 wherein the classifier, the modeler, and the experience notation generator are executed by the computerized processor.

8. The system according to claim 7, further comprising a database for storing the non-textual notations of the user experience-related data.

9. The system according to claim 7, wherein the non-textual notation is indicative at least of: location of the human needs of the user along the hierarchical model of human needs, emotional state of the user, operational state of the user, and their respective lengths of time.

10. The system according to claim 7, further comprising an experience analyzer configured to analyze the time series, by identifying a set of human needs addressed in each one of the plurality of process instances and the level in which the set is addressed, to yield at least one report indicative at least partially of a satisfaction level of the users regarding then set of human needs addressed during each one of the plurality of process instances.

11. The system according to claim 10, further comprising a remedy engine configured to generate at least one recommendations based on the at least one report, wherein the at least one recommendation is directed at amending at least one of the plurality of process instances such that the human needs are better addressed in order to increase the satisfaction level.

12. The system according to claim 10, further comprising a reusability unit configured to generate a library containing at least one sequence of the plurality of process instances that is associated with the at least one report in which the satisfaction level is above a specified threshold.

13. A computer program product for representing user experience through non-textual notation, comprising:
 a computer readable medium encoded with executable program instructions which, when executed by at least one computerized processor, cause the at least one computerized processor to perform operations, comprising:
 first program instructions to classify each one of a plurality of user experience states with a human need classification by identifying, based on a predefined hierarchical model of human needs, a human need that is being addressed at each one of the plurality of user experience states during a sequence of a service provided to users;
 second program instructions to model a real-life environment into a model that includes a plurality of process instances that represent user operations performed at each one of the plurality of user experience states while the users are engaged in receiving the service;
 third program instructions to extract user experience-related data relating to the service from each one of the plurality of process instances of the model; and
 fourth program instructions to represent the user experience-related data of each one of the plurality of process instances as a non-textual notation based on the human need classification assigned to the user experience states, the non-textual notation is expressed as a time series to represent the sequence of the service over time; wherein the non-textual notation is based at least partially on musical notes, wherein higher notes represent a higher location in the hierarchical model of human needs; and wherein the first, second, third, and fourth program instructions are stored on the computer readable medium.

14. The computer program product according to claim 13, further comprising fifth program instructions to generate a database for storing the non-textual notations of the user experience.

15. The computer program product according to claim 13, wherein the non-textual notation is indicative of at least one of: location of the human needs of the user along the hierarchical model of human needs, emotional state of the user, operational state of the user, and their respective lengths of time.

16. The computer program product according to claim 13, further comprising sixth program instructions to analyze the time series, by identifying a set of human needs addressed in each one of the plurality of process instances and the level in which the set is addressed, to yield at least one report indicative at least partially of a satisfaction level of the users regarding then set of human needs addressed during each one of the plurality of process instances.

17. The computer program product according to claim 16, further comprising seventh program instructions to generate at least one recommendation based on the at least one report, wherein the at least one recommendation is directed at amending at least one of the plurality of process instances such that the human needs are better addressed in order to increase the satisfaction level.

18. The computer program product according to claim 16, further comprising eighth program instructions to generate a library containing at least one sequence of the plurality of process instances that is associated with the at least one report in which the satisfaction level is above a specified threshold.

19. The method according to claim 1, wherein the real-life environment consists of a plurality of operations performed by the users while using a product.

20. The method according to claim 1, wherein the non-textual notation is based on at least one emoticon which graphically indicates at least one emotional state.

* * * * *